United States Patent
Hilgren et al.

(10) Patent No.: US 9,254,400 B2
(45) Date of Patent: Feb. 9, 2016

(54) METHOD FOR PROCESSING PEROXYGEN SOLUTIONS

(75) Inventors: John D. Hilgren, Shoreview, MN (US); Jelte Lanting, Hastings, MN (US); Roger John Arthur Tippett, Rosemount, MN (US)

(73) Assignee: Ecolab USA Inc., St. Paul, MN (US)

(*) Notice: Subject to any disclaimer, the term of this patent is extended or adjusted under 35 U.S.C. 154(b) by 133 days.

(21) Appl. No.: 13/038,171

(22) Filed: Mar. 1, 2011

(65) Prior Publication Data

US 2011/0217761 A1    Sep. 8, 2011

Related U.S. Application Data

(60) Provisional application No. 61/309,639, filed on Mar. 2, 2010.

(51) Int. Cl.
| | |
|---|---|
| *A62D 3/02* | (2007.01) |
| *A62D 3/37* | (2007.01) |
| *A62D 101/28* | (2007.01) |
| *C02F 1/70* | (2006.01) |
| *C02F 3/34* | (2006.01) |
| *A62D 101/47* | (2007.01) |
| *C02F 1/28* | (2006.01) |
| *C02F 1/32* | (2006.01) |

(52) U.S. Cl.
CPC .. *A62D 3/02* (2013.01); *A62D 3/37* (2013.01); *C02F 1/70* (2013.01); *C02F 3/342* (2013.01); *A62D 2101/28* (2013.01); *A62D 2101/47* (2013.01); *A62D 2203/02* (2013.01); *A62D 2203/04* (2013.01); *C02F 1/283* (2013.01); *C02F 1/32* (2013.01); *C02F 1/705* (2013.01); *C02F 2303/18* (2013.01); *Y02W 10/30* (2015.05)

(58) Field of Classification Search
CPC ............ A01N 59/00; C11D 3/48; C08K 5/14; A61K 2300/00; C12Q 1/22; D06L 3/021; A62D 3/02; C02F 1/283; C02F 1/32; C02F 1/70
USPC ........................................................ 435/262
See application file for complete search history.

(56) References Cited

U.S. PATENT DOCUMENTS

| | | | |
|---|---|---|---|
| 4,986,963 A * | 1/1991 | Corcoran et al. | ............... 422/30 |
| 5,145,644 A | 9/1992 | Park et al. | |
| 5,733,454 A | 3/1998 | Cummings | |

(Continued)

FOREIGN PATENT DOCUMENTS

| | | |
|---|---|---|
| EP | 0 223 479 B1 | 1/1992 |
| JP | 11-267666 | 10/1999 |

(Continued)

OTHER PUBLICATIONS

Wagner et al., Disinfection of wastewater by hydrogen peroxide or peracetic acid: development of procedures for measurement of residual disinfectant and application to a physicochemically treated municipal effluent., Water Environ Res. (2002), vol. 74(1), pp. 33-50.*

(Continued)

*Primary Examiner* — Alexander Kim
(74) *Attorney, Agent, or Firm* — Merchant & Gould P.C.

(57) ABSTRACT

The present disclosure relates to a multi-step method for processing peroxygen solutions for reuse or disposal. The method uses an enzyme and a reducing agent.

19 Claims, 4 Drawing Sheets

(56) References Cited

U.S. PATENT DOCUMENTS

| | | | |
|---|---|---|---|
| 5,876,990 A | 3/1999 | Reddy et al. | |
| 6,627,657 B1 * | 9/2003 | Hilgren et al. | 514/553 |
| 2006/0201882 A1 | 9/2006 | Chen et al. | |
| 2007/0042094 A1 | 2/2007 | Warf, Jr. et al. | |
| 2007/0264355 A1 * | 11/2007 | Allen et al. | 424/615 |
| 2009/0263539 A1 | 10/2009 | Herdt et al. | |
| 2009/0269324 A1 | 10/2009 | Herdt et al. | |

FOREIGN PATENT DOCUMENTS

| | | |
|---|---|---|
| JP | 2006-289283 | 10/2006 |
| WO | WO 93/04706 | 3/1993 |

OTHER PUBLICATIONS

Davis et al., *Decomposition of peracids and their salts with activated carbon*, Catalysis Letters 31 (1995), pp. 307-311.

Durham et al., *Toxic Impact of Commercial Biocides on Industrial Wastewater Treatment Systems*, WEFTEC (2009), pp. 5670-5689.

International Search Report and Written Opinion mailed Nov. 17, 2011.

Russian Office Action (Appln. No. 2012141885/13(067414), English translation, dated Apr. 8, 2015.

\* cited by examiner

METHOD FOR PROCESSING PEROXYGEN SOLUTIONS

CROSS-REFERENCE TO RELATED APPLICATIONS

This application claims benefit of Provisional Application No. 61/309,639, filed Mar. 2, 2010, which application is incorporated herein by reference.

FIELD

The present disclosure relates to a multi-step method for processing peroxygen solutions for reuse or disposal.

BACKGROUND

Peroxygen compounds are used as decontamination agents, bleaching agents or oxidizing agents in various applications, including in food and beverage processing as food surface decontamination treatments, food packaging decontamination treatments, clean-in-place treatments, food processing water decontamination treatments, food-contact surface decontamination treatments and the like. Used peroxygen solutions must either be reused or disposed of. If the peroxygen solution is disposed of, the residual peroxygen concentration may need to be decreased in order for the peroxygen solution to be compatible with biological waste treatment processes. If the residual peroxygen concentration is too high, the peroxygen compounds can inhibit or kill the beneficial microorganisms used in the wastewater treatment process. It is against this background that the present disclosure is made.

SUMMARY

Introducing selected agents as part of a multi-step method has surprisingly been found to reduce the levels of peroxygen compounds in peroxygen solutions without causing a substantial increase in the level of total dissolved solids, allowing the treated solution to be reused or safely discharged to a biological wastewater treatment process.

A first aspect of the disclosure is a method of treating a peroxygen solution that contains a peracid and hydrogen peroxide. In the method, the peroxygen solution is collected, an enzyme is added and then a reducing agent is added. The enzyme and reducing agent degrade the peroxygen compounds in the solution in a ratio where at least 0.1 parts of the peroxygen compounds are degraded by the enzyme for every 1 part of the peroxygen compounds that is degraded by the reducing agent. It is generally understood that "peroxygen compounds" refer to hydrogen peroxide and peracids.

A second aspect of the disclosure is a method of treating a peroxygen solution that contains a peracid, hydrogen peroxide, and a carboxylic acid. In the method, the peroxygen solution is collected, an enzyme is added and then a reducing agent is added. The enzyme and reducing agent degrade the peroxygen compounds in the solution in a ratio where at least 0.1 parts of the peroxygen compounds are degraded by the enzyme for every 1 part of the peroxygen compounds that is degraded by the reducing agent.

A third aspect of the disclosure is a method of treating a peroxygen solution that contains hydrogen peroxide. In the method, the peroxygen solution is collected, an enzyme is added and then a reducing agent is added. The enzyme and reducing agent degrade the peroxygen compounds in the solution in a ratio where at least 0.1 parts of the peroxygen compounds are degraded by the enzyme for every 1 part of the peroxygen compounds that is degraded by the reducing agent.

A fourth aspect of the disclosure is a method of treating a peroxygen solution. In the method, an enzyme is added to a peroxygen solution before or during a decontamination, bleaching, or oxidizing process. After the decontamination, bleaching, or oxidizing process is complete, a reducing agent is added to the peroxygen solution. The enzyme and reducing agent degrade the peroxygen compounds in the solution in a ratio where at least 0.1 parts of the peroxygen compounds are degraded by the enzyme for every 1 part of the peroxygen compounds that is degraded by the reducing agent.

Other characteristics and advantages of the disclosure will become clear upon reading the description and examples that follow.

DETAILED DESCRIPTION

Figure 1:
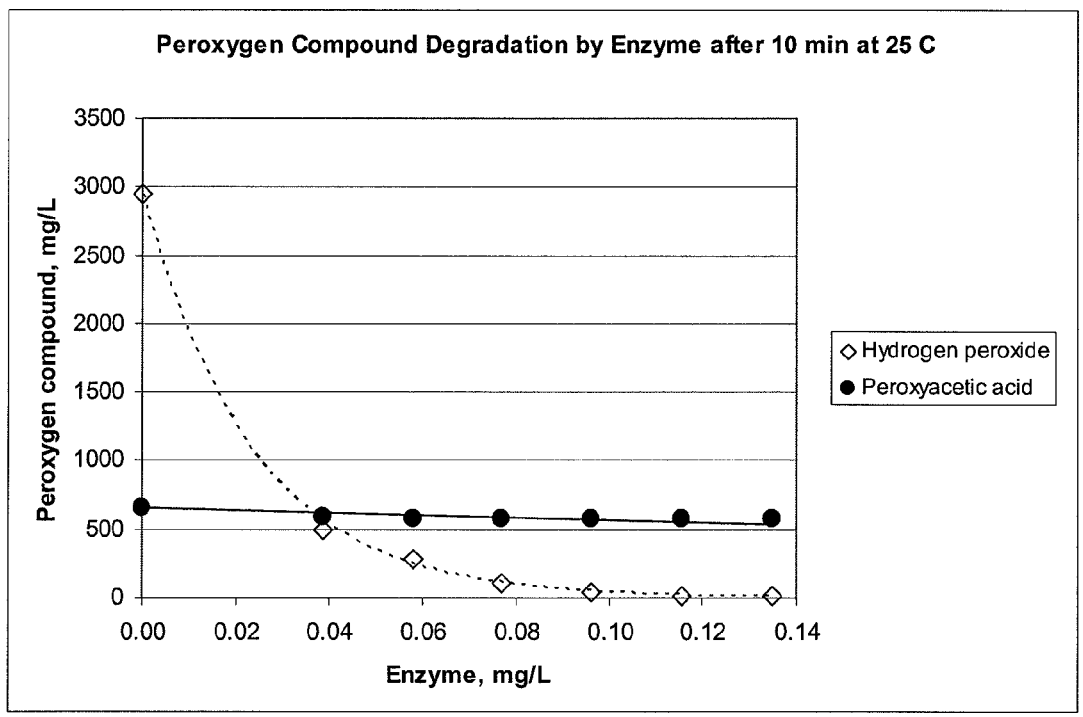
FIG. 1 is a graph showing peroxygen degradation by the enzyme after ten minutes at 25° C.

The present disclosure relates to methods of treating peroxygen solutions for reuse or disposal.

Peroxygen solutions are applied to various surfaces to decontaminate the surface, to bleach that surface, or to function as an oxidizing agent on that surface. Decontamination can refer to a process that reduces physical, chemical, or biological contamination. Examples of surfaces include environmental surfaces such as walls, floors and drains, processing equipment, food packages, food-contact surfaces, ready-to-cook and ready-to-eat food surfaces such as whole and cut meats, carcasses, and fruits and vegetables, textiles such as laundry, carpets, upholstery, curtains, and surgical drapes, kitchen surfaces such as those found in groceries, delis, and restaurants, and healthcare surfaces such as medical instruments, devices and endoscopes, and patient-contact surfaces.

In some methods disclosed herein, a peroxygen solution is collected from a decontamination, bleaching, or oxidizing process such as the ones described above. This peroxygen solution can be referred to, in this disclosure, as the "initial peroxygen solution" because it is the peroxygen solution that enters the disclosed method. It is understood, however, that this "initial peroxygen solution" may have already been used to treat a surface or substance and may be considered at least partially "spent" in terms of its decontamination efficacy or could be a new or fresh solution to be used to treat a surface or substance. The peroxygen solution can be collected as part of a batch process. The peroxygen solution can also be continuously collected and processed as part of a flow through process. In the method, selected agents are added to the initial peroxygen solution in a multi-step process in an amount sufficient to degrade the peroxygen compounds to an acceptable level where the solution can either be reused or disposed of. In the first step, an enzyme is used to degrade the peroxygen compounds and in a second step, a reducing agent is used to further degrade the peroxygen compounds. In cases where the peroxygen compounds includes both hydrogen peroxide and a peracid, the hydrogen peroxide is degraded by the enzyme in the first step, and the peracid is degraded by a reducing agent in the second step.

In some methods disclosed herein, the enzyme may be added to the peroxygen solution in the middle of a decontamination, bleaching, or oxidizing process. For example, the enzyme may be added to the peroxygen solution while the peroxygen solution is being used as part of a clean-in-place operation, or food packaging decontamination operation for aseptic or extended shelf life foods. Once the decontamination, bleaching, or oxidizing process is complete, the reducing agent may be added to the peroxygen solution.

In some methods disclosed herein, the enzyme may be added to the peroxygen solution before the start of the decontamination, bleaching, or oxidizing process, or may be part of the peroxygen solution before starting the decontamination, bleaching, or oxidizing process.

The peroxygen solution may include hydrogen peroxide. The peroxygen solution may include hydrogen peroxide and a peracid. And the peroxygen solution may include hydrogen peroxide, carboxylic acid, and the corresponding peracid. When the peroxygen solution includes a peracid, the peracid can be a single peracid or a mixed peracid solution. The peroxygen solution coming out of a decontamination, bleaching, or oxidizing process can include waste or debris from the process, or from other processes, including water, sugars, starches, fats, oils, proteins, soil, salts, blood, minerals, and detergents. The peroxygen solution may also be combined with other waste streams and then treated.

If the peroxygen solution is disposed of using a biological wastewater treatment process, and the concentration of hydrogen peroxide or peracid is too high, the peroxygen solution can inhibit or potentially kill beneficial microorganisms in the biological wastewater treatment process. Therefore, in the present method, the level of residual peroxygen compounds is reduced so that the biological wastewater treatment process is not adversely affected. Accordingly, the peroxygen solution is collected after being used in a process as a decontamination agent, bleaching agent, or oxidizing agent (initial peroxygen solution) or the peroxygen solution may be still being used as part of a decontamination, bleaching, or oxidizing process. An enzyme is added to the peroxygen solution in an amount sufficient to eliminate 0.1 or more parts (by weight) of the total peroxygen compounds for every 1 part (by weight) eliminated with the reducing agent. After the enzyme is added, a reducing agent is added. Once the enzyme and reducing agent are added to the initial peroxygen solution, the resulting product may be referred to as the "treated peroxygen solution" to differentiate the treated solution from the initial solution that is collected from the decontamination, bleaching, or oxidizing process.

One factor to achieving the desired decrease in the concentration of peroxygen compounds is the contact time between the enzyme or reducing agent and the peroxygen solution. Increasing the contact time between the peroxygen solution and either the enzyme, reducing agent, or both can lead to an improved decrease in the peroxygen concentration. Using plug flow reactors or well mixed reactors in series are two methods of increasing the contact time.

In one specific embodiment, a peroxygen solution that contains hydrogen peroxide, carboxylic acid, and the corresponding peracid can be used as part of a food packaging decontamination operation for aseptic or extended shelf life foods. The enzyme can be added before or during the decontamination process where the food packages are being decontaminated. Once the packages are decontaminated, the peroxygen solution can be collected and then the reducing agent can be added to the peroxygen solution. Once the peroxygen solution has been treated with the enzyme and reducing agent, it can be disposed of or further treated.

In the wastewater treatment process, the peroxygen solution may go through several other processes. For example, the peroxygen solution may be subject to physical and/or chemical separations processes such as screening, gravity settling, sedimentation, equalization, flocculation, mechanical separation, dissolved air floatation (DAF), pH modification, filtration, clarification, disinfection, and biological treatment processes to remove organic compounds, and oxidize the inorganic compounds (e.g., sulfides and ammonia) and total nitrogen (through nitrification and denitrification). Biological treatments may use aerobic, facultative, or anaerobic microorganisms. Biologically treated water may be further clarified using a separations process before disinfection and discharging the remaining liquid into a receiving stream such as a lake or river. One example of a biological process includes an anaerobic waste treatment digestor like the one described in U.S. Pat. No. 5,733,454. The peroxygen solution may also be combined with other waste streams. And, the peroxygen solution (initial or treated) may also be sent to a publicly owned treatment works plant (POTW), municipal sewage treatment facility, industrial waste treatment facility, or a municipal or industrial energy recovery facility.

Enzyme

The enzyme used in the method reduces the concentration of hydrogen peroxide. Exemplary hydrogen peroxide-reducing enzymes include catalase, peroxidase, or a combination of catalase and peroxidase.

Catalase Enzyme

Catalase enzymes catalyze the decomposition of hydrogen peroxide to water and oxygen. Sources of catalase enzymes include animal sources such as bovine catalase isolated from beef livers, fungal catalases isolated from fungi including *Penicillium chrysogenum, Penicillium notatum,* and *Aspergillus niger*, plant sources, bacterial sources such as *Staphylcoccus aureus*, and genetic variations and modifications thereof. Fungal catalases are especially suited because of their ability to decompose hydrogen peroxide at lower concentrations of catalase enzyme compared to non-fungal catalase enzymes. Additionally, fungal catalase enzymes are more stable in the pH and temperature environment found in peroxygen solutions.

The catalase molecule is susceptible to denaturation by heat, oxidation, and pH level extremes. Generally, preferred initial peroxygen solutions contain between 1 and 50000 ppm (by weight) total peroxygen compounds, with a pH between 1 and 10, and a temperature between 1 and 70° C. (34 and 158° F.); or between 1 and 10,000 ppm total peroxygen compounds, with a pH between 2 and 9, and a temperature between 10 and 60° C. (50 and 140° F.); or between 1 and 5000 ppm total peroxygen compounds, with a pH between 3 and 8, and a temperature between 20 and 50° C. (68 and 122° F.).

The catalase may be introduced free floating into the peroxygen solution. Alternatively, the catalase may be immobilized on a surface that is in fluid communication with the peroxygen solution in a way that allows the catalase to interact with and decompose hydrogen peroxide. Immobilized catalase may be more stable than unbound, soluble enzyme. An immobilized catalase also has the advantage of being able to be easily removed from the solution. An immobilized catalase may include a soluble catalase that is attached to a substrate. Examples of substrates may include polyurethane foams, polyacrylamide gels, polyethylenemaleic anhydride gels, polystyrenemaleic anhydride gels, cellulose, nitrocellulose, silastic resins, porous glass, macroporous glass membranes, glass beads, activated clay, zeolites, alumina, silica, silicate and other inorganic and organic substrates. The enzyme may be attached to the substrate in various ways including carrier covalent binding, cross-linking, physical adsorption, ionic binding, and entrapping.

Commercially available catalases are available in liquid and spray dried forms. Commercially available catalase includes both the active enzyme as well as additional ingredients to enhance the stability or performance of the enzyme. Some exemplary commercially available catalase enzymes include Genencor CA-100 and CA-400 as well as Mitsubishi Gas and Chemical (MGC) ASC Super G and ASC Super 200. The method preferably includes at least one fungal catalase.

Peroxidase Enzyme

Peroxidase enzymes also catalyze the decomposition of hydrogen peroxide to water and oxygen. Sources of peroxidase include animals, plants, and microorganisms.

The peroxidase molecule is susceptible to denaturation by heat, oxidation and pH level extremes. Generally, preferred initial peroxygen solutions contain between 1 and 50,000 ppm (by weight) total peroxygen compounds, with a pH between 1 and 10, and a temperature between 1 and 70° C. (34 and 158° F.); or between 1 and 10,000 ppm total peroxygen compounds, with a pH between 2 and 9, and a temperature between 10 and 60° C. (50 and 140° F.); or between 1 and 5,000 ppm total peroxygen compounds, with a pH between 3 and 8, and a temperature between 20 and 50° C. (68 and 122° F.).

The peroxidase may be introduced free floating into the peroxygen solution. Alternatively, the peroxidase may be immobilized on a surface that is in fluid communication with the peroxygen solution in way that allows the peroxidase to interact with and decompose hydrogen peroxide. An immobilized peroxidase has the advantage of being able to be easily removed from the solution. An immobilized peroxidase may include a soluble peroxidase that is attached to a substrate. Examples of substrates may include polyurethane foams, polyacrylamide gels, polyethylenemaleic anhydride gels, polystyrenemaleic anhydride gels, cellulose, nitrocellulose, silastic resins, porous glass, macroporous glass membranes, glass beads, activated clay, zeolites, alumina, silica, silicate and other inorganic and organic substrates. The enzyme may be attached to the substrate in various ways including carrier covalent binding, crosslinking, physical adsorption, ionic binding, and entrapping.

Commercially available peroxidases are available in liquid and powder forms. Commercially available peroxidase includes both the active enzyme as well as additional ingredients to enhance the stability of the enzyme. Some exemplary commercially available peroxidase enzymes include the horseradish peroxidases available from Sigma-Aldrich, Genencor International, and Novozymes.

The Reducing Agent

The reducing agent eliminates some of the hydrogen peroxide not eliminated by the enzyme and it also eliminates some peracid, if it is present. Exemplary reducing agents include the following: bisulfite salts, (e.g., sodium, potassium, and ammonium bisulfite salts, sodium metabisulfite), thiosulfate salts (e.g., sodium, potassium, and ammonium thiosulfate), sulfite salts (e.g., sodium, potassium and ammonium sulfite), sulfur dioxide, porous carbonaceous materials (e.g., charcoal, activated carbon), ascorbic acid, erythorbic acid, metal catalysts (e.g., manganese, silver), and mixtures thereof. The reducing agent can also be a physical process such as ultraviolet (UV) light.

The enzyme and reducing agent should be added in amounts that make noticeable reductions in the concentration of the peroxygen compounds with each addition. The enzyme will always degrade hydrogen peroxide. The reducing agent will degrade either hydrogen peroxide or peracid. How much relative peroxygen that is degraded by the enzyme versus the reducing agent will depend on the concentration of hydrogen peroxide versus peracid. For example, if the peroxygen composition contains high levels of peracid compared to hydrogen peroxide, the enzyme will degrade a smaller amount of hydrogen peroxide compared to the reducing agent degrading the peracid. In contrast, if there is more hydrogen peroxide than peracid, the enzyme will degrade a larger amount of hydrogen peroxide than the reducing agent will degrade the peracid. Since the chemical reducing agent contributes to the TDS levels in the treated peroxygen solution to a much higher degree than the enzyme, the disclosed methods are especially suited for peroxygen solutions with significant levels of hydrogen peroxide relative to the level of peracid. Accordingly, the enzyme and reducing agent are preferably added to the peroxygen solution in amounts where the enzyme degrades at least 0.1 parts of peroxygen for every 1 part of peroxygen that is degraded by the reducing agent. Other ratios include at least 0.5, at least 1, and at least 5 parts of peroxygen that are degraded by the enzyme for every 1 part of peroxygen that is degraded by the reducing agent.

The amount of the enzyme added will vary depending on which enzyme is selected and the concentration of the hydrogen peroxide in the initial peroxygen solution. A person skilled in the art will be able to calculate the amount of enzyme needed to achieve the desired ratios described above, but representative, and non-limiting, concentrations of enzyme include from about 0.01 to about 100 mg/L, from about 0.01 to about 10 mg/L, and from about 0.05 to about 5 mg/L (active enzyme). Likewise, the amount of reducing agent added will vary depending on which reducing agent is selected and the concentration of the peroxygen species in the initial peroxygen solution. A person skilled in the art will be able to calculate the amount of reducing agent needed to achieve the desired ratios described above, but representative, and non-limiting, concentrations of reducing agent, expressed as sodium metabisulfite, include from about 5 to about 450,000 mg/L, from about 10 to about 90,000 mg/L, and from about 10 to about 9,000 mg/L.

After adding the enzyme and reducing agent, the total dissolved solids of the peroxygen solution preferably does not increase by more than 100 mg/L, 1,000 mg/L, or 10,000 mg/L. If used in high quantities, chemical reducing agents such as sodium bisulfite and sodium metabisulfite increase cost and increase the level of total dissolved solids (TDS). The concentration of total dissolved solids in wastewater streams may be regulated or restricted. The TDS level in wastewater is largely due to the presence of inorganic salt ions (e.g., calcium, magnesium, potassium, sodium, bicarbonates, chlorides and sulfates). Wastewater treatment facilities are not normally equipped to remove these salt ions. The concentration of TDS that can be discharged from an industrial facility or POTW may be restricted due to the adverse impact TDS can have on surface waters and aquifers.

Two advantages of the methods disclosed herein are lower levels of reducing agents and lower levels of TDS in the treated peroxygen solution. Consider the following hypothetical example:

|  | Single-step treatment method (reducing agent only) | Single-step treatment method (enzyme only) |
|---|---|---|
| Concentration of hydrogen peroxide in the initial peroxygen solution | 3,000 mg/L | 3,000 mg/L |
| Step 1 - Enzyme | None | 3 mg/L |
| Step 2 - Reducing agent | 9,000 mg/L sodium bisulfite | None |
| Increase in total dissolved solids in the treated peroxygen solution | 9,000 mg/L | 3 mg/L |

For example, for every 1 part (by weight) of hydrogen peroxide in a peroxygen solution, approximately 3 parts of sodium bisulfite are needed to degrade it. Thus, 1 liter of a solution containing 3000 mg of hydrogen peroxide would require approximately 9000 mg of sodium bisulfite for neutralization, resulting in a TDS level increase of approximately 9000 mg/L. In contrast, under the present disclosure, only 3 mg of catalase are added to a 3000 mg/L solution of hydrogen peroxide for neutralization of hydrogen peroxide—this has virtually no impact on the TDS level.

In the disclosed methods, the levels of peroxygen compounds in the treated peroxygen solution is from about 0.1 to about 1,000 ppm, from about 0.1 ppm to about 100 ppm, from about 0.1 ppm to about 10 ppm, and from about 0.1 ppm to about 1 ppm. Alternatively, the treated peroxygen solution is substantially free of peroxygen compounds. Finally, the treated peroxygen solution may be free of peroxygen compounds.

The Peroxygen Solutions

The disclosed methods are used on peroxygen solutions that have been or are being used as part of a decontamination, bleaching, or oxidizing process. The method primarily focuses on the components of the peroxygen solution that are found in the spent peroxygen solution or the waste stream. The peroxygen solution can include hydrogen peroxide. The peroxygen solution can include hydrogen peroxide and peracid. Finally, the peroxygen solution can include hydrogen peroxide, peracid, and the corresponding carboxylic acid for the peracid. If the peroxygen solution includes hydrogen peroxide and peracid, then, in the method, the enzyme is used to degrade hydrogen peroxide in the first step, and then the reducing agent is used to degrade peracid, and hydrogen peroxide if present, in the second step.

The method is preferably used with compositions with significant levels of hydrogen peroxide relative to the level of peracid. For example, preferred ratios of hydrogen peroxide to peracid include 0.1 or more parts (by weight) of hydrogen peroxide per 1 part (by weight) peracid. Additional ratios of hydrogen peroxide:peracid include 0.5:1, 1:1, 2:1, 3:1, 4:1, and 5:1.

Carboxylic Acid.

A carboxylic acid includes any compound of the formula R—(COOH)n in which R can be hydrogen, alkyl, alkenyl, alicyclic group, aryl, heteroaryl, or heterocylic group, and n is 1, 2, or 3. Preferably R includes hydrogen, alkyl, or alkenyl. The alkyl and alkenyl include from 1-12 carbon atoms and can be substituted or unsubstituted.

Examples of suitable carboxylic acids include a variety mono carboxylic acids, dicarboxylic acids, and tricarboxylic acids. Monocarboxylic acids include, for example, formic acid, acetic acid, propanoic acid, butanoic acid, pentanoic acid, hexanoic acid, heptanoic acid, octanoic acid, nonanoic acid, decanoic acid, undecanoic acid, dodecanoic acid, glycolic acid, lactic acid, salicylic acid, acetylsalicylic acid, mandelic acid, etc. Dicarboxylic acids include, for example, adipic acid, fumaric acid, glutaric acid, maleic acid, succinic acid, malic acid, tartaric acid, etc. Tricarboxylic acids include, for example, citric acid, trimellitic acid, isocitric acid, agaicic acid, etc. A carboxylic acid suitable for use in a composition of the invention can be selected for its solubility, cost, approval as food additive, odor, purity, etc. A particularly useful carboxylic acid for a composition of the invention includes a carboxylic acid that is water soluble such as formic acid, acetic acid, propionic acid, butanoic acid, lactic acid, glycolic acid, citric acid, mandelic acid, glutaric acid, maleic acid, malic acid, adipic acid, succinic acid, tartaric acid, etc. These carboxylic acids can also be useful because water-soluble carboxylic acids can be food additives such as formic acid, acetic acid, lactic acid, citric acid, tartaric acid, etc.

Preferred carboxylic acids include acetic acid, octanoic acid, or propionic acid, lactic acid, heptanoic acid, nonanoic acid or a combination thereof.

Peracid.

A peracid is also known in the art as a percarboxylic acid, a peroxyacid, and a peroxycarboxylic acid. A peracid includes any compound of the formula R—(COOOH)n in which R can be hydrogen, alkyl, alkenyl, alicyclic group, aryl, heteroaryl, or heterocyclic group, and n is 1, 2, or 3. Preferably R includes hydrogen, alkyl, or alkenyl.

Preferred peracids include any peroxycarboxylic acid that can be prepared from the acid-catalyzed equilibrium reaction between a carboxylic acid and hydrogen peroxide. Preferably a composition of the invention includes peroxyacetic acid, peroxyoctanoic acid, or peroxypropionic acid, peroxylactic acid, peroxyheptanoic acid, peroxynonanoic acid, or a combination thereof.

Additional Optional Materials

The peroxygen solutions can include a number of additional optional materials including stabilizing agents, hydrotropes, surfactants, defoamers, corrosion inhibitors, rheology modifiers, dyes, and fragrances. These materials are typically part of the peroxygen concentrates and therefore may be present in the initial or treated peroxygen solution.

Stabilizing Agents

The solutions may optionally include stabilizing agents to stabilize and prevent premature oxidation of the concentrated peroxygen material used to prepare a peroxygen solution, or the peroxygen solution itself.

Chelating agents or sequestrants generally useful as stabilizing agents include phosphonic acid and phosphonates, phosphates, aminocarboxylates and their derivatives, pyrophosphates, ethylenediamine and ethylenetriamine derivatives, hydroxyacids, and mono-, di-, and tri-carboxylates and their corresponding acids. Other chelating agents include nitroloacetates and their derivatives, and mixtures thereof. Examples of aminocarboxylates include amino acetates and salts thereof. Suitable amino acetates include: N-hydroxyethylaminodiacetic acid; hydroxyethylenediaminetetraacetic acid; nitrilotriacetic acid (NTA); ethylenediaminetetraacetic acid (EDTA); N-hydroxyethyl-ethylenediaminetriacetic acid (HEDTA); tetrasodium ethylenediaminetetraacetic acid (EDTA); diethylenetriaminepentaacetic acid (DTPA); and alanine-N,N-diacetic acid; n-hydroxyethyliminodiacetic acid; and the like; their alkali metal salts; and mixtures thereof. Suitable aminophosphates include nitrilotrismethylene phosphates and other aminophosphates with alkyl or alkaline groups with less than 8 carbon atoms. Exemplary polycarboxylates include iminodisuccinic acids (IDS), sodium polyacrylates, citric acid, gluconic acid, oxalic acid, salts thereof, mixtures thereof, and the like. Additional polycarboxylates include citric or citrate-type chelating agents, polymeric polycarboxylate, and acrylic or polyacrylic acid-type chelating agents. Additional chelating agents include polyaspartic acid or co-condensates of aspartic acid with other amino acids, $C_4$-$C_{25}$-mono- or -dicarboxylic acids and $C_4$-$C_{25}$-mono- or -diamines. Exemplary polymeric polycarboxylates include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

Hydrotropes

The solution may optionally include a hydrotrope coupler or solubilizer. Such materials can be used to ensure that the concentrated peroxygen material used to prepare a peroxygen solution, or the peroxygen solution itself, remains phase stable and in a single highly active aqueous form. Such hydrotrope solubilizers or couplers can be used at concentrations that maintain phase stability but do not result in unwanted compositional interaction.

Representative classes of hydrotrope solubilizers or coupling agents include an anionic surfactant such as an alkyl sulfate, an alkyl or alkane sulfonate, a linear alkyl benzene or naphthalene sulfonate, a secondary alkane sulfonate, alkyl ether sulfate or sulfonate, an alkyl phosphate or phosphonate, dialkyl sulfosuccinic acid ester, sugar esters (e.g., sorbitan esters) and a $C_{8-10}$ alkyl glucoside.

Coupling agents can also include n-octane sulfonate, aromatic sulfonates such as an alkyl aryl sulfonate (e.g., sodium xylene sulfonate or naphthalene sulfonate), and alkylated diphenyl oxide disulfonic acids, such as those sold under the DOWFAX™ trade name, preferably the acid forms of these hydrotropes.

Surfactants

The composition may optionally include a surfactant or mixture of surfactants. The surfactant may include anionic, nonionic, cationic, amphoteric, and zwitterionic surfactants, which are commercially available, and mixtures thereof. In an embodiment, the surfactant includes a nonionic or anionic surfactant. For a discussion of surfactants, see Kirk-Othmer, Encyclopedia of Chemical Technology, Third Edition, volume 8, pages 900-912.

Nonionic surfactants can include those having a polyalkylene oxide polymer as a portion of the surfactant molecule. These surfactants can be capped or uncapped. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, fatty alcohol ethoxylates (e.g., tridecyl alcohol alkoxylate, ethylene oxide adduct), and the like; nonylphenol ethoxylate, polyoxyethylene glycol ethers, and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC (BASF-Wyandotte), and the like; ethoxylated amines and ether amines commercially available from Tomah Corporation and other like nonionic compounds. Silicone surfactants such as the ABIL B8852 (Goldschmidt) can also be used.

The nonionic surfactant can include linear and secondary alcohol ethoxylates (fatty alcohol ethoxylates, e.g., tridecyl alcohol alkoxylate, ethylene oxide adduct), alkyl phenol ethoxylates, ethoxy/propoxy block surfactants, and the like. Examples of preferred linear and secondary alcohol ethoxylates (fatty alcohol ethoxylates, e.g., tridecyl alcohol alkoxylate, ethylene oxide adduct) include the five mole ethoxylate of linear, primary 12-14 carbon number alcohol ($C_{12-14}H_{25-29}$)—O—$(CH_2CH_2)_5$H of which is sold under the tradename LAE 24-5), the seven mole ethoxylate of linear, primary 12-14 carbon number alcohol ($C_{12-14}H_{25-29}$)—O—$(CH_2CH_2O)_7$H (one of which is sold under the tradename LAE 24-7), the twelve mole ethoxylate of linear, primary 12-14 carbon number alcohol ($C_{12-14}H_{25-29}$)—O—$(CH_2CH_2O)_{12}$H (one of which is sold under the tradename LAE 24-12), and the like.

Anionic surfactants can include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates (e.g., linear dodecyl benzene sulfonic acid or salts thereof), alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, ethoxylated alcohol phosphate esters, and the like.

Surface active substances are classified as cationic if the charge on the hydrophilic portion of the molecule is positive. Surfactants in which the hydrophile carries no charge unless the pH is lowered close to neutrality or lower, but which are then cationic (e.g. alkyl amines), are also included in this group.

Cationic surfactants may be found in some peroxygen solutions. Cationic surfactants can include compounds containing at least one long carbon chain hydrophobic group and at least one positively charged nitrogen. The long carbon chain group may be attached directly to the nitrogen atom by simple substitution; or indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of a branched or straight chain moiety of varying degrees of unsaturation or of a saturated or unsaturated heterocyclic ring. In addition, cationic surfactants may contain complex linkages having more than one cationic nitrogen atom.

The cationic surfactant can include a quaternary ammonium surfactant, such as a tallow quaternary ammonium surfactant like a tallow amine ethoxylate quaternary ammonium compound. For example, a tallow amine ethoxylate quaternary ammonium compound can include a quaternary nitrogen bonded to a methyl group, a tallow moiety, and two ethoxylate moieties. The ethoxylate moieties can include 6-10 ethoxylate groups.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The majority of large volume commercial cationic surfactants can be subdivided into four major classes and additional sub-groups, for example, as described in "Surfactant Encyclopedia", Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, dialkylammonium salts, and the like.

Defoamers

The solution may optionally include defoamers. Generally, defoamers can include silica and silicones; aliphatic acids or esters; alcohols; sulfates or sulfonates; amines or amides; halogenated compounds such as fluorochlorohydrocarbons; vegetable oils, waxes, mineral oils as well as their sulfated derivatives; and phosphates and phosphate esters such as alkyl and alkaline diphosphates, and tributyl phosphates among others; and mixtures thereof. Food grade defoamers are preferred. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as Ardefoam™ from Armour Industrial Chemical Company which is a silicone bound in an organic emulsion; Foam Kill™ or Kresseo™ available from Kirusable Chemical Company which are silicone and non-silicone type defoamers as well as silicone esters; and Anti-Foam A™ and DC-200 from Dow Corning Corporation which are both food grade type silicones among others.

Corrosion Inhibitors

The solution may optionally include a corrosion inhibitor. Useful corrosion inhibitors include polycarboxylic acids such as short chain carboxylic diacids, triacids, as well as phosphate esters and combinations thereof. Useful phosphate esters include alkyl phosphate esters, monoalkyl aryl phosphate esters, dialkyl aryl phosphate esters, trialkyl aryl phosphate esters, and mixtures thereof such as Emphos PS 236 commercially available from Witco Chemical Company. Other useful corrosion inhibitors include the triazoles, such as benzotriazole, tolyltriazole and mercaptobenzothiazole, and in combinations with phosphonates such as 1-hydroxyethylidene-1,1-diphosphonic acid, and surfactants such as oleic acid diethanolamide and sodium cocoamphohydroxypropyl sulfonate, and the like. Useful corrosion inhibitors include polycarboxylic acids such as dicarboxylic acids. The acids which are preferred include adipic, glutaric, succinic, and mixtures thereof. The most preferred is a mixture of adipic, glutaric and succinic acid, which is a raw material sold by BASF under the name SOKALAN™ DCS.

Rheology Modifiers

The solution may optionally include one or more rheology modifiers.

Water soluble or water dispersible rheology modifiers that are useful can be classified as inorganic or organic. The organic thickeners can further be divided into natural and synthetic polymers with the latter still further subdivided into synthetic natural-based and synthetic petroleum-based.

Inorganic thickeners are generally compounds such as colloidal magnesium aluminum silicate (VEEGUM™), colloidal clays (Bentonites), or silicas (CAB-O-SILS™) which have been fumed or precipitated to create particles with large surface to size ratios. Suitable natural hydrogel thickeners are primarily vegetable derived exudates. For example, tragacanth, karaya, and acacia gums; and extractives such as carrageenan, locust bean gum, guar gum and pectin; or, pure culture fermentation products such as xanthan gum. Chemically, all of these materials are salts of complex anionic polysaccharides. Synthetic natural-based thickeners having application are cellulose derivatives wherein the free hydroxyl groups on the linear anhydro-glucose polymers have been etherified or esterified to give a family of substances, which dissolve in water and give viscous solutions. This group of materials includes the alkyl and hydroxyllalkycelluloses, specifically methylcellulose, hydroxyethylmethylcellulose, hydroxypropylmethylcellulose, hydroxybutylmethycellulose, hydroxyethylcellulose, ethylhydroxyethylcellulose, hydroxypropylcellulose, and carboxymethylcellulose. Synthetic petroleum-based water soluble polymers are prepared by direct polymerization of suitable monomers of which polyvinylpyrrolidone, polyvinylmethylether, polyacrylic acid and polymethacrylic acid, polyacrylamide, polyethylene oxide, and polyethyleneimine are representative.

Dyes and Fragrances

The solution may optionally include various dyes, odorants including perfumes, and other aesthetic enhancing agents. Preferred dyes include FD&C dyes, D&C dyes, and the like.

For a more complete understanding of the disclosure, the following examples are given to illustrate some embodiments. These examples and experiments are to be understood as illustrative and not limiting. All parts are by weight, except where it is contrarily indicated.

EXAMPLES

Example 1

The purpose of Example 1 was to characterize the impact of catalase enzyme on the levels of hydrogen peroxide and peroxyacetic acid in a peroxygen solution. Various levels of the catalase enzyme Optimase® CA 400L (Genencor International, Rochester, N.Y.) were added to a peroxygen solution at 25° C. and held for 10 minutes while mixing. Note that the enzyme concentration measures the concentration of the active enzyme. The peroxygen solution was prepared from Oxonia Active® (Ecolab Inc., St. Paul, Minn.) and contained 2952 ppm hydrogen peroxide and 650 ppm peroxyacetic acid at the start of the experiment. After the 10 minute exposure, the levels of hydrogen peroxide and peroxyacetic acid were measured.

The results are shown in FIG. 1 and demonstrate that the addition of catalase to a peroxygen solution resulted in significant elimination of hydrogen peroxide, but provided no meaningful elimination of peroxyacetic acid.

Example 2

The purpose of Example 2 was to characterize the impact of the reducing agent sodium bisulfite on the levels of hydrogen peroxide and peroxyacetic acid in a peroxygen solution. Various levels of sodium bisulfite (Sigma-Aldrich, St. Louis, Mo.) were added to a peroxygen solution at 25° C. and held for 30 minutes. The peroxygen solution was prepared from Oxonia Active® (Ecolab Inc., St. Paul, Minn.) and contained 225 ppm hydrogen peroxide and 50 ppm peroxyacetic acid at the start of the experiment. After the 30 minute exposure, the levels of hydrogen peroxide and peroxyacetic acid were measured.

Figure 2:
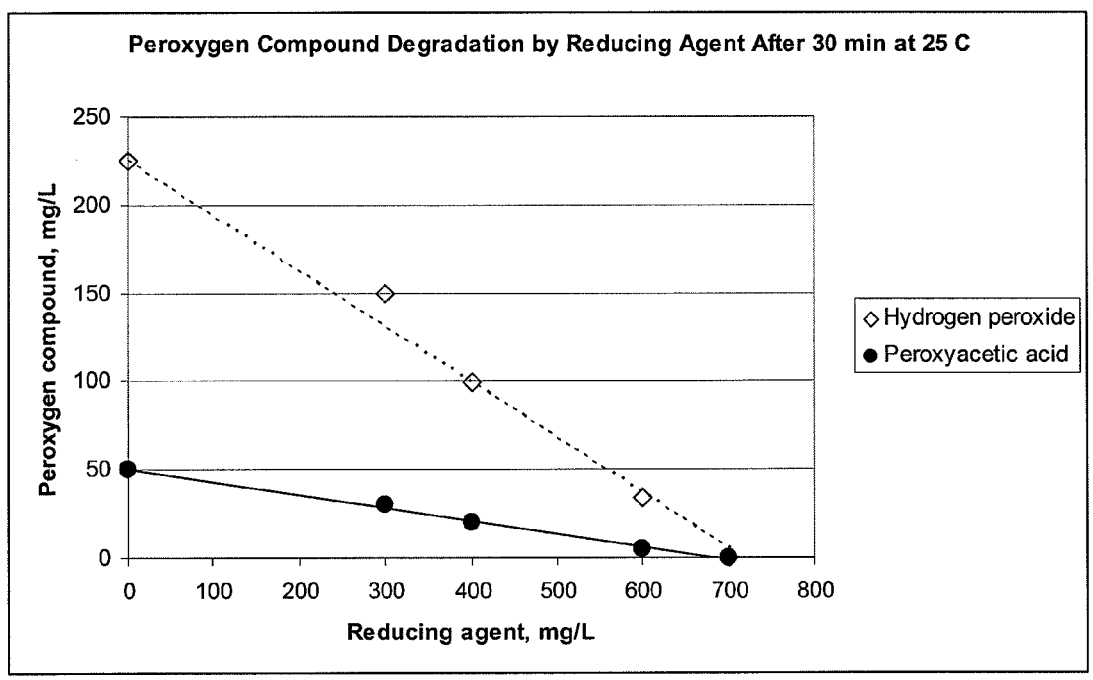
FIG. 2 is a graph showing peroxygen compound degradation by the reducing agent after thirty minutes at 25° C.

The results are shown in FIG. 2 and demonstrate that the addition of sodium bisulfite to a peroxygen solution results in significant elimination of hydrogen peroxide and peroxyacetic acid. The rate of elimination of hydrogen peroxide was proportional to the rate of elimination of peroxyacetic acid.

Example 3

The purpose of Example 3 was to characterize the impact of exposure time on elimination of hydrogen peroxide from a peroxygen solution using catalase. The catalase enzyme Optimase® CA 400L (Genencor International, Rochester, N.Y.) was added to a peroxygen solution to result in a final concentration of 0.116 mg/L. The peroxygen solution was prepared from Oxonia Active® (Ecolab Inc., St. Paul, Minn.) and contained 2893 ppm hydrogen peroxide and 634 ppm peroxyacetic acid at the start of the experiment. At 2-minute intervals, the level of hydrogen peroxide was measured.

Figure 3:
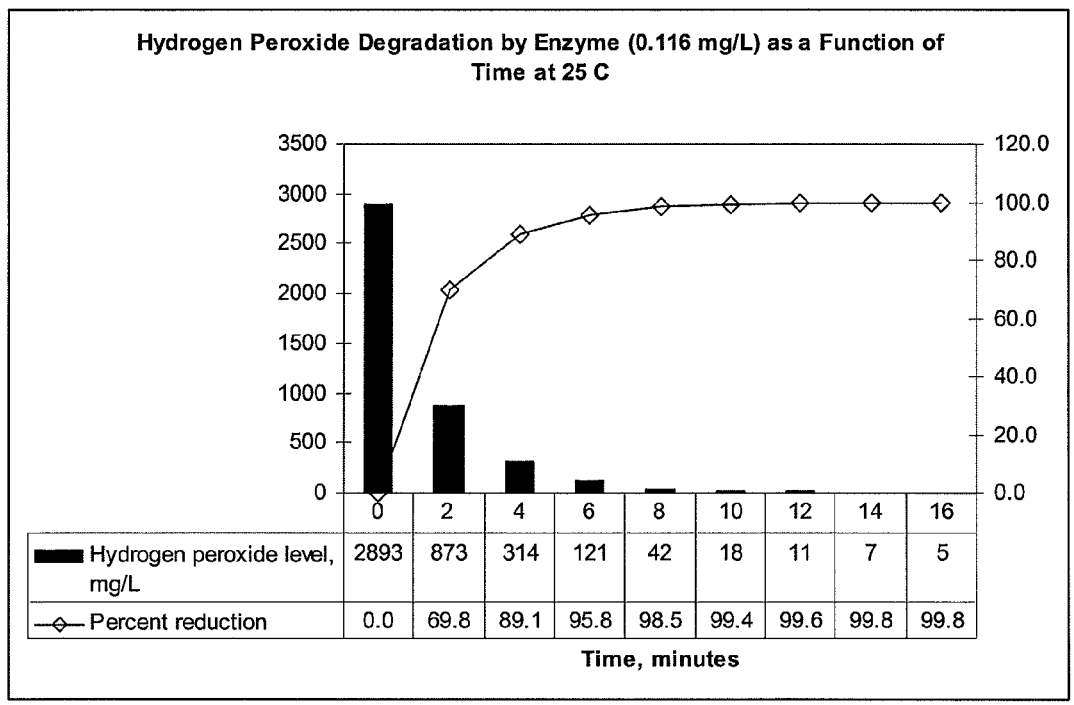
FIG. 3 is a graph showing hydrogen peroxide degradation by the enzyme as a function of time at 25° C.

The results are shown in FIG. 3 and demonstrate that the addition of catalase to a peroxygen solution eliminated approximately 50, 90, and 99% of the starting level of hydrogen peroxide in 1, 5, and 10 minutes respectively.

Example 4

The purpose of Example 4 was to characterize the impact of exposure temperature on degradation of hydrogen peroxide from a peroxygen solution using catalase. Various levels of the catalase enzyme Optimase® CA 400L (Genencor International, Rochester, N.Y.) were added to peroxygen solutions at different temperatures. The peroxygen solutions were prepared from Oxonia Active® (Ecolab Inc., St. Paul, Minn.) and contained approximately 2950 ppm hydrogen peroxide and approximately 650 ppm peroxyacetic acid at the start of the experiment. After a 10 minute exposure, the level of hydrogen peroxide was measured. The data was normalized to account for slight differences in starting concentrations, and log-transformed to adapt a linear model.

Figure 4:
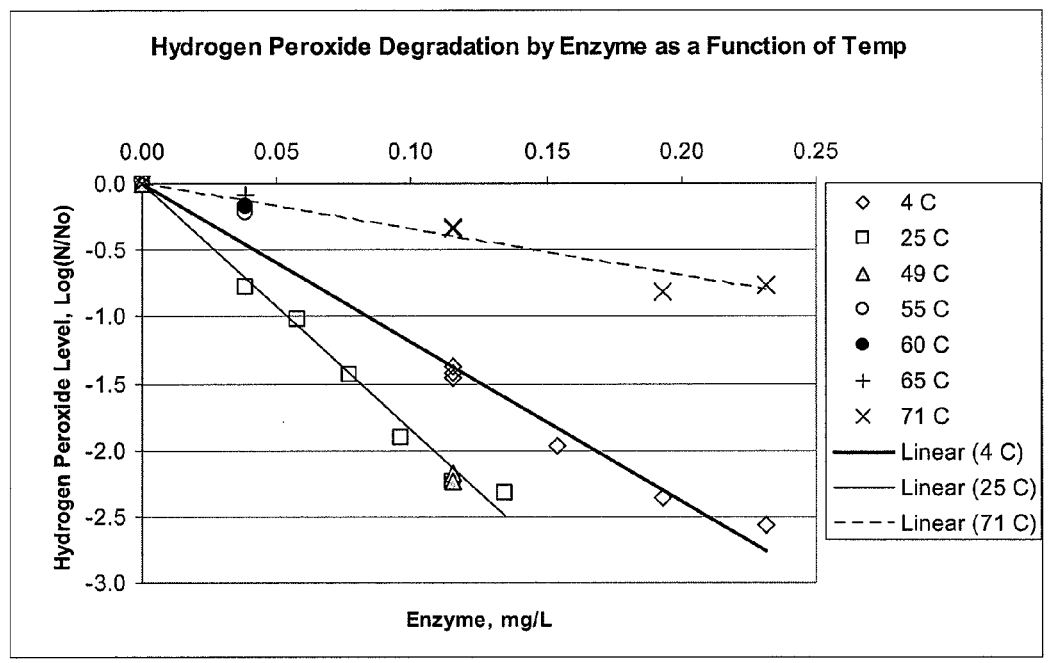
FIG. 4 is a graph showing hydrogen peroxide degradation by the enzyme as a function of temperature.

The results are shown in FIG. 4 and demonstrate that the efficacy of catalase for degradation of hydrogen peroxide in peroxygen solutions was more effective within a temperature range of approximately 25 to 50° C. The efficacy of catalase for elimination of hydrogen peroxide in peroxygen solutions was decreased at temperatures above 50° C., and at 4° C.

Example 5

The purpose of Example 5 was to compare the levels of TDS in peroxygen solutions neutralized using two different processes: (1) a process using the reducing agent sodium bisulfite alone, and (2) a process using catalase enzyme followed by sodium bisulfite. In a first experiment, a minimum level of the sodium bisulfite (Sigma-Aldrich, St. Louis, Mo.) was added to a peroxygen solution to degrade both the hydrogen peroxide and peroxyacetic acid. In a second experiment, in a first step, the minimum level of the catalase enzyme Optimase® CA 400L (Genencor International, Rochester, N.Y.) was added to a peroxygen solution to degrade the hydrogen peroxide only within 10 minutes at 25° C. In a second step, a minimum level of the sodium bisulfite was added to the peroxygen solution to degrade the remaining peroxygen compounds. The peroxygen solutions in both experiments were prepared from Oxonia Active® (Ecolab Inc., St. Paul, Minn.) and contained 2952 ppm hydrogen peroxide and 650 ppm peroxyacetic acid at the start of the experiment.

The results are shown in Table 1 and demonstrate that the level of TDS in a peroxygen solution treated using a the reducing agent sodium bisulfite alone (Process 1) was 13.6- times greater than a process using catalase enzyme followed by sodium bisulfite (Process 2).

TABLE 1

| Treatment step | Process 1 | Process 2 |
| --- | --- | --- |
| 1 - Enzyme (g per 100 g sample) | 0 | 0.006 |
| 2 - Reducing agent (g per 100 gram sample) | 0.919 | 0.081 |
| Peroxygen compound level after treatment (mg/L) | <1 | <1 |
| TDS level after treatment (mg/L) | 10900 | 800 |

Example 6

The purpose of Example 6 was to compare the levels of total peroxygen compounds in a peroxygen solution treated using a variation of the Process 2 described in Example 5, specifically, a process in which the order of addition was reversed (i.e., sodium bisulfite was added first, then catalase). This new process was designated Process 3. In this experiment, in a first step, the same level of sodium bisulfite (Sigma-Aldrich, St. Louis, Mo.) used in Example 5, Process 2 was added to a peroxygen solution. In a second step, the same level of the catalase enzyme Optimase® CA 400L (Genencor International, Rochester, N.Y.) used in Example 5, Process 2 was added to the peroxygen solution. The peroxygen solution used in the experiment was prepared from Oxonia Active® (Ecolab Inc., St. Paul, Minn.) and contained 2886 ppm hydrogen peroxide and 636 ppm peroxyacetic acid at the start of the experiment.

The results are shown in Table 2 and demonstrate that reversing the order of addition (i.e., adding the reducing agent first, then the enzyme) was not effective in degrading the peroxygen compounds.

TABLE 2

| Treatment step | Process 3 |
| --- | --- |
| 1 - Reducing agent (g per 100 g sample) | 0.081 |
| 2 - Enzyme (g per 100 g sample) | 0.006 |
| Peroxygen compounds level after treatment (mg/L) | 312 |

Example 7

The purpose of Example 7 was to characterize how hydrogen peroxide degradation efficiency in a peroxygen solution is affected when the ratio of enzyme to peroxygen compounds is changed. The catalase enzyme Optimase® CA 400L (Genencor International, Rochester, N.Y.) was added to two different peroxygen solutions to result in a final enzyme concentration of 0.039 mg/L. The peroxygen solution was prepared from Oxonia Active® (Ecolab Inc., St. Paul, Minn.) and contained either 2943 ppm hydrogen peroxide and 650 ppm peroxyacetic acid at the start of the experiment (Peroxygen Solution 1), or 577 ppm hydrogen peroxide and 129 ppm peroxyacetic acid at the start of the experiment (Peroxygen Solution 2). After a 10 minute exposure at 55° C., the level of hydrogen peroxide was measured.

The results are shown in Table 3 and demonstrate that the degradation of hydrogen peroxide in a peroxygen solution is more effective when the ratio of enzyme to hydrogen peroxide is increased. Thus, it can be preferable to add a set quantity of enzyme to the peroxygen solution before that peroxygen solution is diluted.

TABLE 3

| Peroxygen solution | Percent reduction in hydrogen peroxide level |
|---|---|
| 1 - higher ratio of enzyme to peroxygen compounds | 92% |
| 2 - lower ratio of enzyme to peroxygen compounds | 40% |

Example 8

The purpose of Example 8 was to determine the efficacy of the disclosed method on an extended shelf life food packaging line of a commercial-scale beverage plant. The impact of reagent dose, contact time, and temperature were also evaluated.

Various concentrations of Oxonia Active were applied to containers on the packaging line. After the containers were treated, the spent peroxygen solutions were collected. Various concentrations of catalase enzyme (Optimase CA-400L) were added to the solution and allowed to react. Then, various concentrations of BC1002 (a 30% sodium metabisulfite solution, commercially available from Ecolab Inc., St. Paul, Minn.) were added to the solution and allowed to react. Samples were collected after the addition of the enzyme and the sodium metabisulfite and analyzed. The results are shown below.

Table 4 shows that a dose of 1 part of catalase to 5,000 parts of hydrogen peroxide at a contact time of 20 minutes generally reduced the concentration of hydrogen peroxide to below the detection limit of the test method used. Higher concentrations decreased in as little as 10 minutes.

TABLE 4

| Catalase:$H_2O_2$ | 10 min | 20 min | 30 min |
|---|---|---|---|
| 1:1250 | 5 ppm H2O2 | 5 ppm H2O2 | 4 ppm H2O2 |
| 1:2500 | 5 ppm H2O2 | 5 ppm H2O2 | 4 ppm H2O2 |
| 1:5000 | 65 ppm H2O2 | 5 ppm H2O2 | 4 ppm H2O2 |

Table 5 shows that hydrogen peroxide degradation by catalase increases as temperature increases, which may be desirable for compositions with low peroxygen concentrations.

TABLE 5

| 1:5000 (catalase:$H_2O_2$) | | | |
|---|---|---|---|
| Temp | 10 min | 15 min | 30 min |
| 23.4 C. | 125 ppm H2O2 | 21 ppm H2O2 | 4 ppm H2O2 |
| 37.5 C. | 12.5 ppm H2O2 | 4 ppm H2O2 | 4 ppm H2O2 |

Tables 6 and 7 show that a dose of 1.75 to 2.6 parts of sodium metabisulfite from BC1002 (30% sodium metabisulfite) per part of peracetic acid at a contact time of 10 minutes adequately reduced the concentration of peracetic acid.

TABLE 6

| sodium metabisulfite:PAA | 5 mins | 10 mins | 20 mins |
|---|---|---|---|
| 2.61:1 | 0 ppm PAA | 0 ppm PAA | 0 ppm PAA |
| 1.96:1 | 0 ppm PAA | 0 ppm PAA | 0 ppm PAA |
| 1.31:1 | 20 ppm PAA | 20 ppm PAA | 20 ppm PAA |

TABLE 7

| sodium metabisulfite:PAA | 5 min | 10 min | 15 min |
|---|---|---|---|
| 1.25:1 | 67 ppm PAA | 53 ppm PAA | 52 ppm PAA |
| 1.50:1 | 37 ppm PAA | 30 ppm PAA | 30 ppm PAA |
| 1.75:1 | n.d. | n.d. | n.d. |
| 2.00:1 | n.d. | n.d. | n.d. |

Table 8 determined the effect of temperature on the ability of the sodium metabisulfite in BC1002 (30% sodium metabisulfite) to reduce the concentration of peracetic acid in a ratio of 1.75 parts of sodium metabisulfite to 1 part of peracetic acid. Table 8 shows that temperature has very little effect on peracetic acid reduction.

TABLE 8

| | 30 sec | 1 min | 2 min |
|---|---|---|---|
| 39° C. | 2 | n.d. | n.d. |
| 25° C. | 2 | n.d. | n.d. |
| 12° C. | 3 | n.d. | n.d. |

Table 9 determined the effect of peracetic acid starting concentration and contact time on the reaction between the sodium metabisulfite and peracetic acid. Table 9 shows that the reaction of the sodium metabisulfite of BC1002 with the peracetic acid in a ratio of 1.75:1 seems generally completed in less than 10 minutes, but also seems to yield a lower residual at higher starting concentrations of peracetic acid, suggesting that the rate of reaction is concentration dependent.

TABLE 9

| (sodium metabisulfite:PAA = 1.75:1) PAA starting concentration | 10 min | 20 min | 30 min |
|---|---|---|---|
| 60 ppm | 30 ppm | 25 ppm | 20 ppm |
| 180 ppm | 9 ppm | 9 ppm | 8 ppm |
| 540 ppm | n.d. | n.d. | n.d. |
| 1,620 ppm | n.d. | n.d. | n.d. |

The foregoing summary, detailed description, and examples provide a sound basis for understanding the disclosure and some specific examples. Since the invention can comprise a variety of embodiments, the above information is not intended to be limiting. The invention resides in the claims.

We claim:

1. A method of treating a peroxygen solution comprising:
   a) collecting an initial peroxygen solution comprising a peracid and hydrogen peroxide wherein the initial peroxygen solution is collected from a decontamination process, bleaching process, or oxidation process in a food and beverage plant, a healthcare facility, a kitchen, a restaurant, a laundry, or a wastewater-treatment plant;
   b) adding 1 mg/L or less of an isolated enzyme per every 1000 mg/L of hydrogen peroxide to the initial peroxygen solution, and then
   c) adding a reducing agent to the solution of step b), wherein 0.1 parts to 5 parts by weight of the hydrogen peroxide are degraded by the enzyme for every 1 part by weight of the peracid and hydrogen peroxide that is degraded by the reducing agent; and
   d) forming a treated peroxygen solution as a result of adding the enzyme and reducing agent.

2. The method of claim 1, wherein the peracid is selected from the group consisting of peracetic acid, peroctanoic acid, and mixtures thereof.

3. The method of claim 1, wherein the enzyme is selected from the group consisting of catalase, peroxidase, and mixtures thereof.

4. The method of claim 1, wherein the reducing agent is selected from the group consisting of bisulfite salts, metabisulfite salts, thiosulfate salts, sulfite salts, sulfur dioxide, charcoal, activated carbon, ascorbic acid, erythorbic acid, metal catalysts, UV light, and mixtures thereof.

5. The method of claim 1, wherein the pH of the initial peroxygen solution is from about 1 to about 10.

6. The method of claim 1, wherein the temperature of the initial peroxygen solution is from about 1° C. to about 70° C.

7. The method of claim 1, wherein the peracid concentration in the initial peroxygen solution is from about 1 ppm to about 50000 ppm.

8. The method of claim 1, wherein the treated peroxygen solution is further treated with a wastewater treatment process.

9. The method of claim 1, wherein the treated peroxygen solution is reused in a facility.

10. The method of claim 1, further comprising discharging the treated peroxygen solution into a body of water.

11. The method of claim 1, wherein the peracid concentration in the treated peroxygen solution is from about 0.1 ppm to about 1000 ppm.

12. The method of claim-1, wherein the total dissolved solids in the treated peroxygen solution does not increase by more than 10000 ppm.

13. The method of claim 1, wherein the initial or treated peroxygen solution further comprises a material selected from the group consisting of a carboxylic acid, stabilizing agent, hydrotrope, surfactant, defoamer, corrosion inhibitor, rheology modifier, dye, fragrance, water, sugar, salt, fat, oil, protein, starch, detergent, mineral, soil, blood, and mixtures thereof.

14. The method of claim 1, wherein the enzyme and reducing agent are added to the peroxygen solution after it has been used in a decontamination, bleaching or oxidizing process but before it is combined with other waste streams.

15. The method of claim 1, wherein the enzyme and reducing agent are added to the peroxygen solution after it has been used in a decontamination, bleaching, or oxidizing process and combined with other waste streams.

16. The method of claim 1, wherein the enzyme and reducing agent are added at the same location as the decontamination, bleaching, or oxidizing process.

17. The method of claim 1, wherein the enzyme and reducing agent are added to a process at a publicly owned treatment works plant, industrial waste treatment facility, or a municipal or industrial energy recovery facility.

18. A method of treating a peroxygen solution comprising:
a) collecting an initial peroxygen solution comprising hydrogen peroxide;
b) adding 1 mg/L or less of an isolated enzyme per every 1000 mg/L of hydrogen peroxide to the peroxygen solution;
c) adding a reducing agent to the peroxygen solution wherein 0.1 parts to 5 parts by weight of the hydrogen peroxide are degraded by the enzyme for every 1 part by weight of the hydrogen peroxide that is degraded by the reducing agent; and
d) forming a treated peroxygen solution as a result of adding the enzyme and reducing agent.

19. A method of treating a peroxygen solution comprising:
a) adding an enzyme to a peroxygen solution before or during a decontamination, bleaching, or oxidizing process in a food and beverage plant, a healthcare facility, a kitchen, a restaurant, a laundry, or a wastewater-treatment plant, the peroxygen solution comprising hydrogen peroxide, and then
b) adding a reducing agent to the peroxygen solution after the decontamination, bleaching, or oxidizing process is complete
wherein 0.1 parts to 5 parts by weight of the hydrogen peroxide are degraded by the enzyme for every 1 part by weight of the hydrogen peroxide that is degraded by the reducing agent; and
c) forming a treated peroxygen solution as a result of adding the enzyme and reducing agent.

* * * * *